(12) United States Patent
Josten et al.

(10) Patent No.: US 8,733,855 B2
(45) Date of Patent: May 27, 2014

(54) ARC RESISTANT SWITCHGEAR MODULAR COMPARTMENT FOR INSTRUMENTATION AND CIRCUIT BREAKERS

(75) Inventors: Harry W. Josten, Grapevine, TX (US); Keith Flowers, Euless, TX (US); Rahul Rajvanshi, Irving, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 74 days.

(21) Appl. No.: 13/101,396

(22) Filed: May 5, 2011

(65) Prior Publication Data

US 2012/0013227 A1    Jan. 19, 2012

Related U.S. Application Data

(60) Provisional application No. 61/363,690, filed on Jul. 13, 2010.

(51) Int. Cl.
| | |
|---|---|
| *A47B 81/00* | (2006.01) |
| *A47B 97/00* | (2006.01) |
| *A47B 95/00* | (2006.01) |
| *H01J 5/00* | (2006.01) |
| *H01J 15/00* | (2006.01) |
| *H02G 3/08* | (2006.01) |
| *H05K 5/00* | (2006.01) |
| *H02B 1/00* | (2006.01) |
| *H02B 5/00* | (2006.01) |
| *H02B 11/00* | (2006.01) |
| *H02B 1/26* | (2006.01) |

(52) U.S. Cl.
USPC .......... 312/223.1; 312/296; 174/50; 361/600; 361/605; 361/622

(58) Field of Classification Search
USPC .............. 312/223.1, 236, 109, 213, 326, 329, 312/296; 361/600, 605, 608, 614, 616, 617, 361/622–636; 218/155–158; 454/184; 174/50

See application file for complete search history.

(56) References Cited

U.S. PATENT DOCUMENTS

| | | | | |
|---|---|---|---|---|
| 3,305,287 | A * | 2/1967 | Rait | 312/400 |
| 3,989,986 | A * | 11/1976 | Farley et al. | 361/605 |
| 5,689,097 | A * | 11/1997 | Aufermann et al. | 218/157 |
| 5,753,878 | A * | 5/1998 | Doughty et al. | 218/157 |
| 6,015,197 | A * | 1/2000 | DiGiacomo et al. | 312/223.6 |
| 6,205,017 | B1 * | 3/2001 | Wilkie et al. | 361/605 |
| 6,388,867 | B1 * | 5/2002 | Rakus et al. | 361/605 |
| 6,407,331 | B1 * | 6/2002 | Smith et al. | 174/50 |
| 6,410,844 | B1 * | 6/2002 | Bruner et al. | 174/17 VA |
| 6,417,443 | B1 * | 7/2002 | Smith | 174/17 VA |
| 6,504,125 | B2 * | 1/2003 | Nishitani | 218/68 |
| 6,629,614 | B2 * | 10/2003 | Jordan | 211/26 |
| 8,045,322 | B2 * | 10/2011 | Kurogi et al. | 361/614 |

(Continued)

*Primary Examiner* — Janet M Wilkens
*Assistant Examiner* — Andrew Roersma (57) ABSTRACT

Modular bucket assemblies enable selective configuration of switchgear compartments for conformance with selective levels of personnel accessibility to energized switchgear. The bucket assemblies can be configured to enable personnel access to energized compartments while service doors are open, such as for instrumentation compartments. Interiors and the front face of instrumentation compartment bucket assemblies are isolated from potential infiltration of hot arc gasses in the switchgear cabinet. Other compartments can be configured to enable personnel access to the front face of a fully closed door energized circuit breaker compartment by isolating the compartment door exterior and venting any hot arc gasses out of the compartment interior in a direction away from the front and other peripheral sides of the switchgear cabinet.

20 Claims, 5 Drawing Sheets

(56) References Cited

U.S. PATENT DOCUMENTS

| | | | |
|---|---|---|---|
| 2009/0173118 A1* | 7/2009 | Schulz et al. | 70/275 |
| 2009/0180242 A1* | 7/2009 | Coomer et al. | 361/636 |
| 2010/0072039 A1* | 3/2010 | Coomer et al. | 200/50.21 |
| 2011/0299226 A1* | 12/2011 | Milovac et al. | 361/605 |

* cited by examiner

ARC RESISTANT SWITCHGEAR MODULAR COMPARTMENT FOR INSTRUMENTATION AND CIRCUIT BREAKERS

CLAIM TO PRIORITY

This application claims the benefit of co-pending U.S. provisional patent application entitled "Arc Resistant Switchgear Instrumentation/Breaker Compartment Design" filed Jul. 13, 2010 and assigned Ser. No. 61/363,690, which is incorporated by reference herein.

BACKGROUND OF THE DISCLOSURE

1. Field of the Invention

The invention relates generally to switchgear apparatus for electrical power distribution, and more particularly to a modular bucket assembly adapted for insertion into compartments of arc resistant switchgear. The bucket assembly retains electrical distribution and control apparatus, such as for example circuit breakers and instrumentation. A complete bucket assembly, including retained electrical apparatus, is adapted for insertion into a switchgear cabinet compartment. The present invention modular bucket assembly allows a switchgear manufacturer to construct arc resistant switchgear selectively to different service personnel accessibility levels. The modular bucket assembly of the present invention also facilitates subsequent installation and upgrade at field sites or overhaul service centers, should the switchgear operator wish to modify the switchgear accessibility level after manufacture.

2. Description of the Prior Art

Switchgear and switchboard are general terms which cover metal enclosures housing switching and interrupting devices, such as fuses and circuit breakers, along with associated control, instrumentation and metering devices; also assemblies of these devices with associated buses, interconnections and supporting structures used for distribution of electric power. Low voltage switchgear and switchboards operate at voltages up to 635 volts and with continuous currents that can exceed 5000 amperes. They are designed to withstand short-circuit currents up to 200,000 amperes.

Typical low voltage switchgear equipment is often an assembly composed of multiple metal enclosed sections or cabinets. Each section may have several circuit breakers stacked one above the other vertically in the front of the section with each breaker being enclosed in its own metal compartment. Each section has a vertical or section bus which supplies current to the breakers within the section cabinet via short horizontal branch buses that extend through insulated openings in the rear wall of the breaker compartments. The vertical buses in each section are supplied with current by a horizontal main bus that runs through the line-up. The rear of the section is typically an open area for the routing of cables.

Low voltage switchgear and switchboards are typically designed to withstand the effects of bolted (non-arcing) faults on the load terminals and this capability is validated during Short-Circuit Current and Short-Time Current Withstand Tests in Institute for Electrical and Electronics Engineers ("IEEE") Standard C37.20.1, the disclosure of which is incorporated herein by reference.

Standard metal-enclosed switchgears are designed to withstand the mechanical forces generated by bolted faults on the load terminals until a power circuit breaker or other protective device can interrupt the flow of fault current. This capability is verified by short-circuit and short-time withstand tests on the equipment and interruption tests on the power circuit breakers. During a bolted fault, the voltage at the fault location is essentially zero and the fault energy is dissipated throughout the power system. The arc generated within the power circuit breaker during interruption is cooled and extinguished by the circuit breaker internal arc chutes. The minimal out gassing of arc byproducts from the arc chutes is contained by the switchgear, as verified by interruption tests.

The occurrence of an arcing fault inside the switchgear produces physical phenomena that are different from bolted faults. An internal arcing fault can be caused by insulation degradation, insulation contamination, entrance of vermin, foreign objects coming into contact with the energized bus, or any other unplanned condition that creates an electrical discharge path through air. During an arcing fault, the voltage at the fault location is essentially the system voltage and the fault energy is focused within the switchgear enclosure. Arc temperatures can exceed 20,000 degrees Kelvin, rapidly heating the air and vaporizing metal parts. The expanding plasma creates mechanical and thermal stress in the equipment that potentially can be released outside the switchgear cabinet. Materials involved in or exposed to the arc produce hot decomposition products, both gaseous and particulate, which may be discharged to the outside of the enclosure. In the event of an arcing fault in switchgear, is desirable to vent hot decomposition products in directions where they are not likely to contact personnel.

One known way to avoid personnel contact with decomposition products released by switchgear undergoing an arc fault is to prohibit personnel from being present when the switchgear is energized. This is not practical when it is required to service one or more switchgear compartments while other compartments must remain energized to perform necessary electrical distribution and control functions.

Thus a need exists in the art for arc resistant switchgear that directs hot decomposition products created by an internal arcing fault away from the front, sides and rear of switchgear equipment while personnel must be present to service portions of the energized switchgear. Commonly owned U.S. Pat. No. 7,821,774 entitled. "Mounting Base With Arc Plenum" and pending U.S. patent application Ser. No. 12/362,715, filed Jan. 30, 2009 and claiming priority of Provisional Application No. 61/030,321, filed on Feb. 21, 2008, the complete contents of both of which are fully incorporated by reference herein, are directed to inventions for channeling internal hot arc gasses away from the sides of switchgear.

Another need exists in the art for arc resistant switchgear having enclosure compartments capable of selectively meeting different personnel accessibility standards while being energized: for example a single switchgear section cabinet that accommodates both circuit breaker or other electrical apparatus compartments along with adjoining instrumentation and control compartments. During switchgear energization the circuit breaker compartments coupled to the full "live" power voltage and amperage. Accordingly, circuit breaker compartment doors are kept closed while the switchgear is energized. Instrumentation and control component compartments are not coupled to the full "live" power, and are generally operated with relatively low AC power of under 120 volt and/or DC power of 24 volt or less. Instrumentation compartment doors may need to be opened by personnel during switchgear energization, so that they can view and record instrument readings or adjust equipment settings.

The need to combine both instrumentation and circuit breaker compartments in the same switchgear section cabinet creates another need for compartment configurations capable of meeting all personnel accessibility standards that can be readily configured and reconfigured during manufacture, subsequent retrofitting or repair in response to changing needs of the switchgear operator.

SUMMARY OF THE INVENTION

Accordingly, an object of the invention is to create switchgear that inhibits passage of gas decomposition products through switchgear compartment enclosure access locations, where they might contact service personnel in proximity to the compartment.

Another object of the present invention is to create switchgear capable of accommodating different types of electrical apparatus and equipment having different personnel accessibility standards within the same enclosure cabinet; for example an instrumentation compartment and a circuit breaker compartment within the same vertical section of a switchgear cabinet enclosure.

Yet another object of the present invention is to create a switchgear cabinet enclosure having modular bucket assemblies that can be readily configured and reconfigured during manufacture, subsequent retrofitting or repair, to meet changing needs of the switchgear operator. For example, to configure an enclosure compartment to meet accessibility standards for either open or closed door operation during manufacture and to reconfigure the same compartment to meet the other accessibility standard should future operational needs require different equipment applications.

These and other objects are achieved in accordance with the present invention by the modular bucket assemblies of the present invention, having modular peripheral barriers adapted for sealing peripheral gaps between the bucket assembly the switchgear cabinet enclosure when the bucket assembly is inserted into the switchgear. Peripheral barrier assemblies may be configured to seal compartments for applications where corresponding compartment doors are intended to remain closed during switchgear energization and for applications requiring internal compartment access by opening the door while the switchgear is energized.

The present invention features a modular bucket assembly adapted for coupled insertion into an electrical distribution system switchgear cabinet compartment. The compartment has a front opening including a corresponding front opening periphery that receives the bucket assembly, and a corresponding swinging switchgear door for selectively covering the compartment front opening when closed against the periphery. The door also provides access to the compartment front opening when opened. The modular bucket assembly has a box-shaped bucket adapted for coupled insertion into a switchgear cabinet compartment, and includes a pair of bucket side walls, a bucket rear wall and a bucket top wall. The bucket walls define an open front bucket periphery. In this embodiment, the bucket assembly also has a peripheral barrier assembly that is adapted for sealing a gap established between the respective bucket and compartment front opening peripheries when the bucket assembly is inserted into the enclosure compartment. At least a portion of the barrier assembly has a proximal portion that is coupled to the bucket about at least a portion of the open front bucket periphery and a corresponding distal portion projecting outwardly from the bucket periphery. The barrier distal portion is adapted for biased contact with a corresponding enclosure compartment front opening periphery when the bucket assembly is inserted therein, so that the respective contacting surfaces inhibit arc fault decomposition product gas outflow from the switchgear compartment front face.

The present invention also features a modular bucket assembly adapted for coupled insertion into an electrical distribution system switchgear cabinet compartment. The compartment has a front opening including a corresponding front opening periphery that receives the bucket assembly, and a corresponding swinging switchgear door for selectively covering the compartment front opening when closed against the periphery. The door also provides access to the compartment front opening when opened. The modular bucket assembly has a box-shaped bucket adapted for coupled insertion into a switchgear compartment. In this embodiment, the bucket assembly has a pair of bucket side walls, a bucket rear wall, a bucket top wall, and a bucket bottom wall. All of the bucket walls define an open front bucket periphery. A swinging barrier covers an access aperture formed in at least one of the bucket walls. The aperture is used for insertion of objects into the bucket assembly, such as cables and wires. The swinging barrier is oriented, so that increase of ambient air pressure on the bucket assembly exterior, such as caused by an arc fault, biases the barrier into abutment with its corresponding bucket wall, so that the bucket interior space is sealed around, the cable/wire access aperture. A bucket flange is coupled to at least a portion of the open front bucket periphery. The bucket flange projects generally perpendicularly from the bucket periphery and is adapted for spanning a gap established between the respective bucket and compartment front opening peripheries when the bucket assembly is inserted into the enclosure compartment. The bucket assembly includes a peripheral barrier assembly that is adapted for sealing a gap established between the respective bucket and compartment front opening peripheries when the bucket assembly is inserted into the switchgear compartment. At least a portion of the barrier assembly has a proximal portion that is coupled to the bucket flange and a corresponding distal portion projecting outwardly from the bucket periphery. The barrier distal portion is adapted for biased contact with a compartment front opening periphery when the bucket assembly is inserted therein, so that the respective contacting surfaces inhibit arc fault decomposition product gas outflow from the switchgear compartment front face.

In other embodiments of the present invention different types of bucket assemblies may be utilized in different compartments of a switchgear cabinet. In this type embodiment, an electrical distribution system switchgear cabinet has multiple compartment front openings, each including a corresponding front opening periphery. The cabinet has first and second side walls, a back wall, a floor and a top cover forming a closed structure about the front openings. In this embodiment, a first compartment formed within the switchgear front opening is coupled to a first bucket assembly. The first bucket assembly has first bucket walls that form a closed box defining an open front bucket periphery. A swinging barrier covers an aperture formed in at least one of the first bucket walls that is used for insertion of objects into the first bucket assembly. The swinging barrier is oriented so that increase of ambient air pressure (such as caused by an arc fault) on the first bucket assembly exterior biases the barrier into abutment with its corresponding bucket wall. In this embodiment, a second compartment in the switchgear is coupled to a second bucket assembly having a circuit breaker enclosed therein. An arc gas venting passage in the switchgear cabinet is in communication with the circuit breaker within the second bucket assembly and the interior of the second compartment, for exhausting arc gasses from the circuit breaker to the switchgear exterior. In this embodiment, the switchgear also has first and second swinging switchgear doors corresponding to each first and second compartment, for selectively covering the entire respective compartment front opening when closed against the periphery thereof and providing access to the respective compartment front opening when opened. The first bucket assembly prevents arc gasses from escaping through the corresponding first bucket and first compartment front opening peripheries in any first compartment door position. The second bucket assembly is adapted for preventing arc gasses from escaping through the corresponding second bucket and second compartment front opening peripheries when the second compartment door is secured in a closed position over the second compartment front opening.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of this invention can be readily utilized in modular bucket assemblies adapted for insertion into compartments of arc resistant switchgear that are selectively configurable for different service personnel accessibility levels. For example, an instrumentation compartment can be assembled with an instrumentation bucket assembly that allows service personnel to open that compartment's front door while the switchgear cabinet is energized, in conformity with the IEEE C37.20.7 Accessibility Type 2B standard. Alternatively, another compartment within the same switchgear cabinet can be assembled with a circuit breaker instrumentation bucket assembly that allows service personnel to be in proximity to the front of energized switchgear cabinet compartments while the circuit breaker compartment door is fully closed (and at yet another respective standard level also the cabinet rear or sides), in conformity with IEEE C37.20.7 Type 1 or Type 2 standards, respectively. The modular construction, features of the present invention readily enable selective configuration and reconfiguration of cabinet compartments during manufacture or subsequent retrofit service, to meet changing operational needs.

General Overview of Switchgear Cabinet

Figure 1:
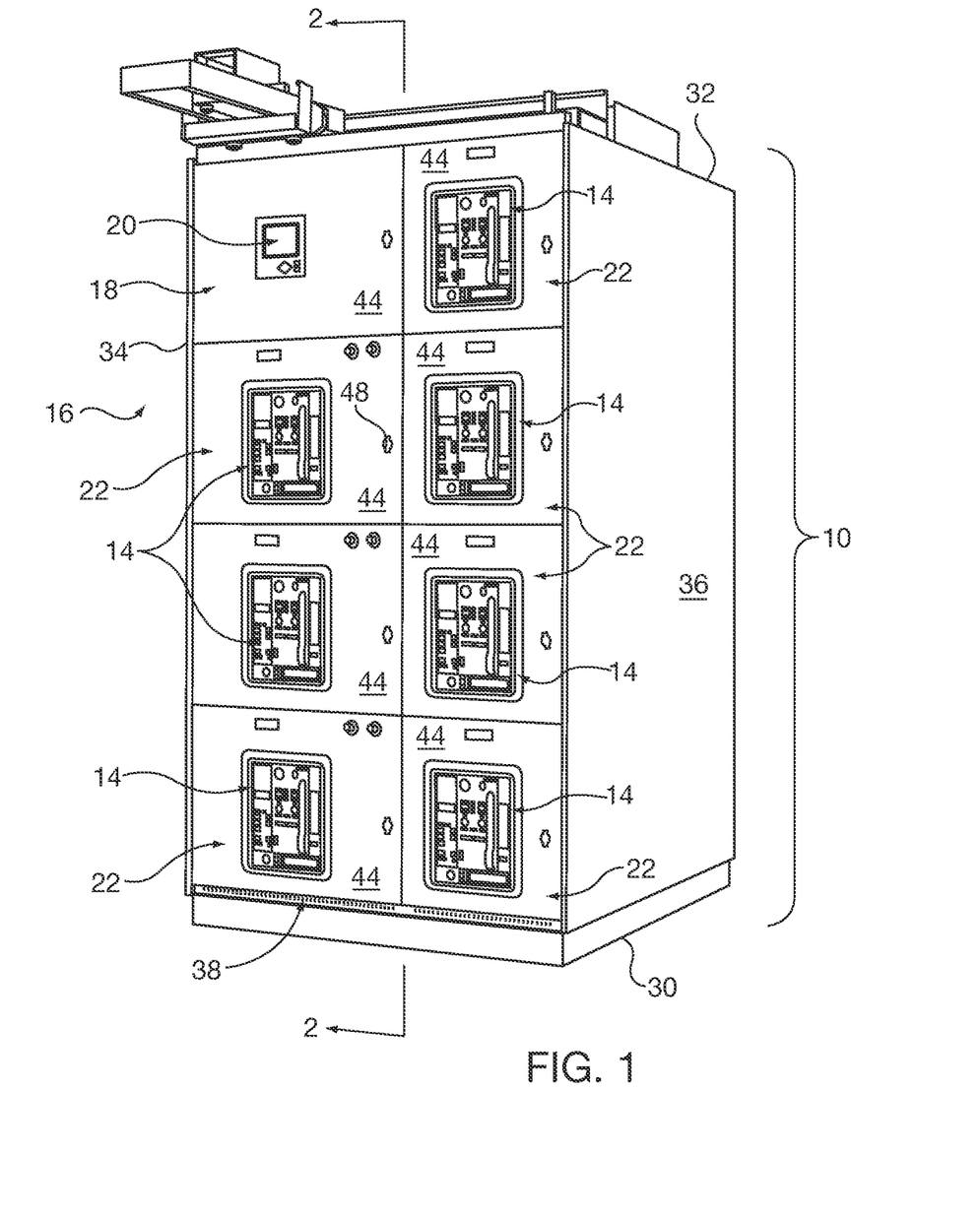
FIG. 1 shows a front perspective view of a switchgear cabinet of the present invention.
Figure 2:
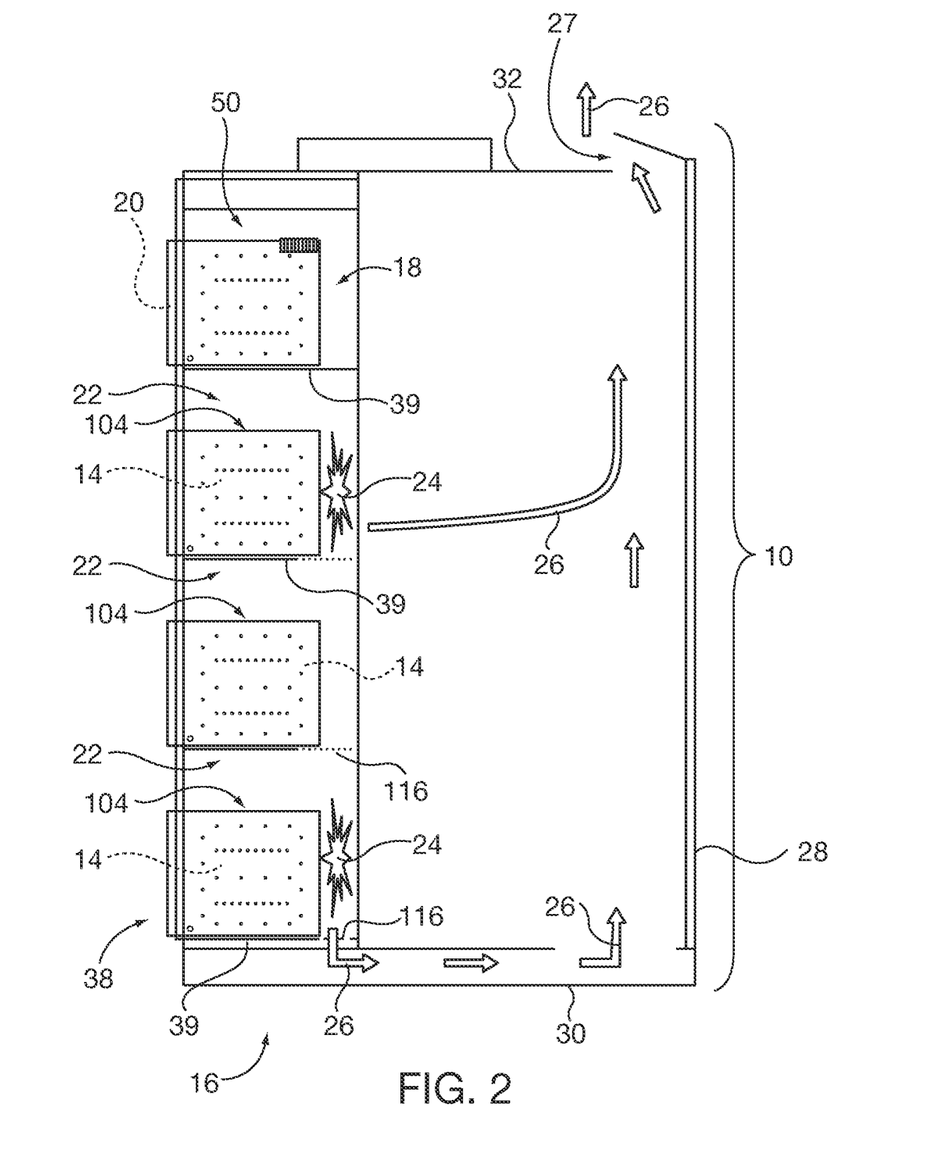
FIG. 2 is a cross-sectional elevational view taken along 2-2 of FIG. 1.

Referring to FIGS. 1 and 2, exemplary electrical distribution system switchgear 10 routes electrical power to circuit breakers 14 or other circuit protection and control electrical apparatus located within compartments of the switchgear cabinet 16. Switchgear cabinet 16 is of generally known construction, and may include internal structural framing, compartment walls, and power distribution busbars that are not shown. Exemplary switchgear cabinet structures are shown in co-pending commonly owned U.S. patent application Ser. No. 12/362,715, filed Jan. 30, 2009 and U.S. Pat. No. 7,821,774, issued Oct. 26, 2010, the entire contents of each of which are incorporated by reference herein.

As shown in FIGS. 1 and 2, switchgear cabinet 16 has one or more of a first type instrumentation compartment 18 that retains monitoring and control instruments 20, such as power meters. Monitoring and control instruments in the instrumentation compartment 18 are generally powered by 120 volts or less AC power, or alternatively by 24 volt DC power sources. The instruments 20 generally receive and transmit analog or digital monitoring and communication electronic or optical signals, which are also at voltage levels below their power sources described above.

In contrast to instrumentation compartments 18, the second type of electrical apparatus compartments 22 that contain circuit breakers 14 are capable of distributing electric power at the previously described switchgear rated levels: typically up to 635 volts and continuous currents that can exceed 5000 amperes. The switchgear is designed to withstand short-circuit currents up to 200,000 amperes. In the occurrence of an arcing fault 24 (shown schematically in FIG. 2), energy generated by an arc in the air causes sudden pressure and temperature increases inside the enclosure that may produce plasma, pressurized hot gaseous and/or particulate decomposition products 26 (shown by schematic double arrows in FIG. 2). As taught in U.S. Pat. No. 7,821,774 and pending U.S. patent application Ser. No. 12/362,715, decomposition products 26 may be retained within the switchgear cabinet 16 or vented in a manner that reduces risk of exposure to nearby personnel, such as via exterior roof vent 27. One skilled in the art also appreciates the desirability of isolating relatively delicate instrumentation 20 in the instrumentation compartment(s) 18 from the decomposition products 26.

In order to isolate or divert arcing fault decomposition products 26 away from nearby personnel, as is required to meet certain personnel access standards, switchgear cabinets 16 are constructed, with sealed, or continuous outer walls, including back wall 28, floor or sill wall 30, top cover or roof 32, as well as left and right side walls 34, 36, and front face 38. In this manner the decomposition products 26 are diverted through roof vent 27, above heads of nearby personnel. Alternatively, decomposition products 26 may be diverted into expansion chambers at the base of or below floor level of the switchgear cabinet 16. Compartments may also include fully or partially inwardly extending compartment bottom walls 39 or other peripheral walls (not shown).

Figure 6:
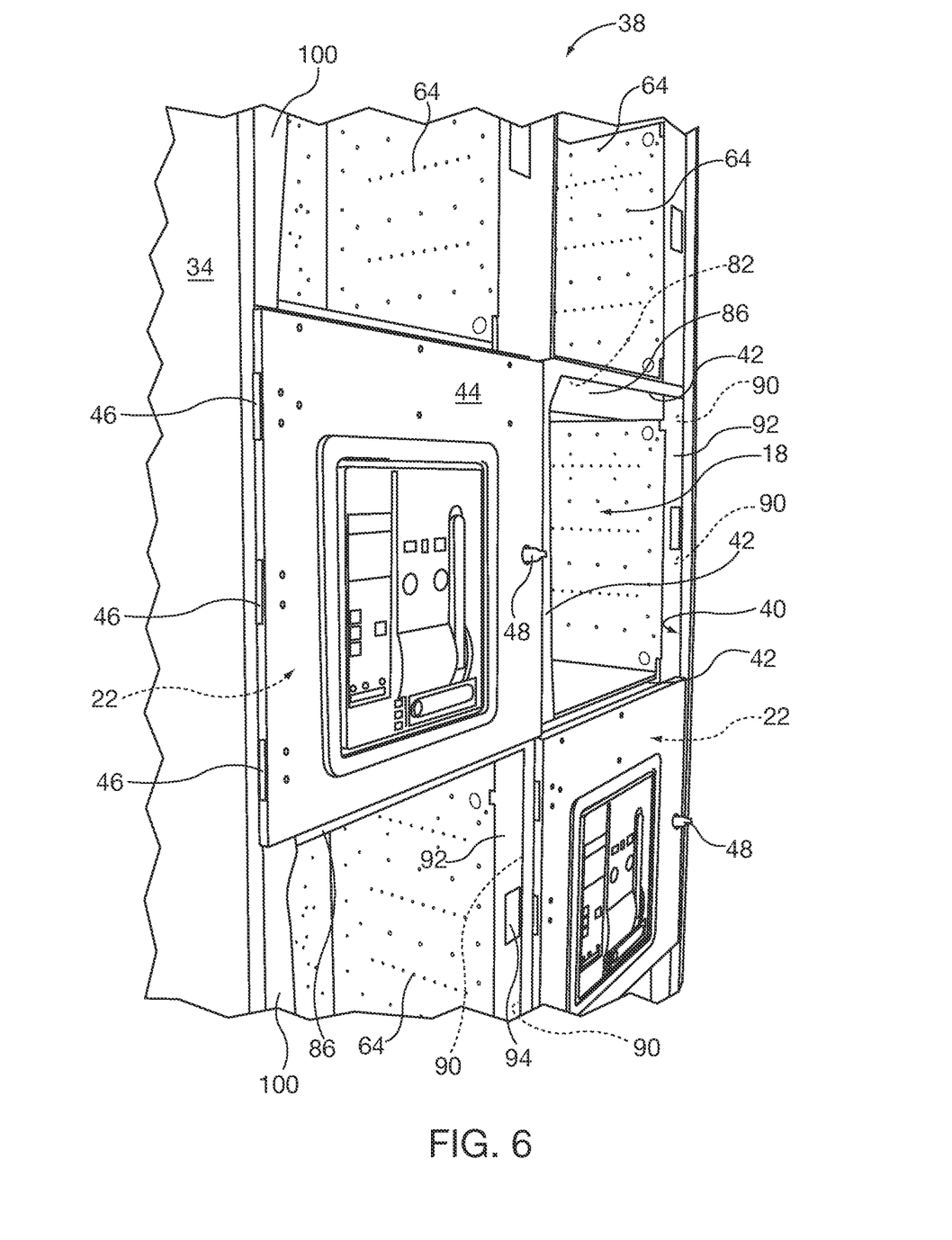
FIG. 6 is an elevational perspective view of an alternative partially assembled switchgear cabinet showing installed circuit breaker bucket assemblies and empty instrumentation bucket assemblies of the present invention within switchgear compartments.

Referring generally to FIGS. 1, 2 and 6, the front face 38 of the switchgear cabinet 16 provides access to the respective instrumentation 18 and circuit breaker 22 compartments via front openings 40. Dimensions of each front opening 40 is defined by front opening periphery 42. The front openings 40 are selectively covered by swinging doors 44, mounted on hinges 46. Desirably each door 44 is secured in closed position by a door lock 48.

As previously noted, IEEE personnel access standards will dictate whether the switchgear cabinet front opening 40 construction allows decomposition products 26 to escape freely through the cabinet front face 38. For example, if an open gap exists between the cabinet front opening periphery 42 and the door 44 perimeter, personnel are not authorized to be near energized switchgear. Conversely, personnel may be allowed access to energized switchgear if there is no appreciable gap between the cabinet front opening periphery 42 and the locked, closed door 44 perimeter for each opening in the switchgear cabinet. This is because decomposition products 26 do not escape from the front face 38 in appreciable quantities that might cause injury. Furthermore, if appreciable quantities of decomposition products 26 cannot pass from a compartment front opening 40 or its front opening periphery 42, personnel are authorized, to be near the energized switchgear cabinet while that compartment's corresponding door 44 is in an open position. The present invention includes modular bucket assemblies that facilitate selective levels of switchgear cabinet front opening sealing through use of modular structural and insulative components. By application of the present invention a manufacturer can provide solutions for multiple levels of personnel access as is needed for different field applications in the same switchgear cabinet 16.

Switchgear Instrumentation Bucket Assembly

FIGS. 3, 3A, 3B and 4 show an exemplary instrumentation bucket assembly 50, that may be advantageously formed from a single sheet metal stamping, including left and right instrumentation bucket side walls 52, 54, rear wall 56 and top wall 58. Optional instrumentation bucket bottom wall 60 is affixed to the corresponding side walls 52, 54 and rear wall 56. Alternatively the corresponding switchgear cabinet bottom wall 39 may be substituted for the bucket 50 bottom wall 60 by attaching the instrumentation bucket side walls 52, 54, rear wall 56 directly to the cabinet bottom wall 39.

Figure 3:
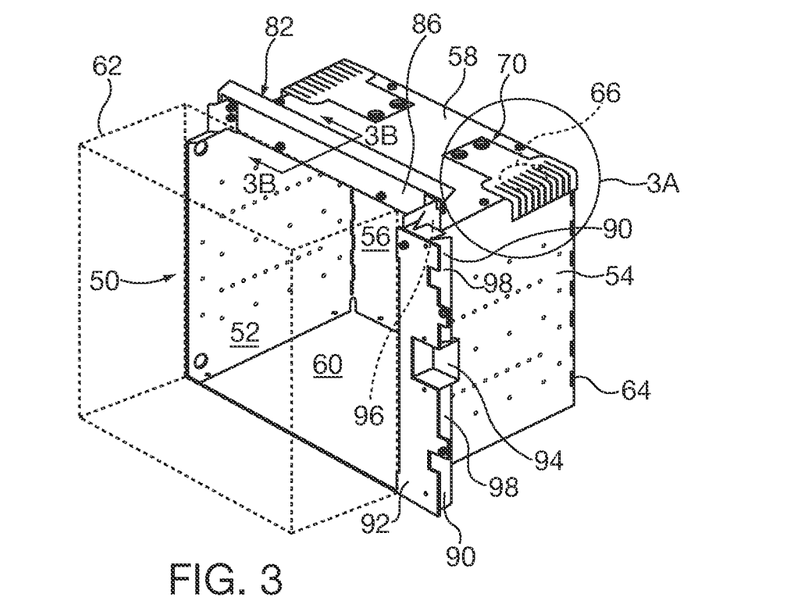
FIG. 3 is a perspective view of an instrumentation bucket assembly of the present invention.

As also shown in FIGS. 2, 3 and 6, the instrumentation bucket assembly 50 is a generally closed, box-shaped structure with an open front bucket periphery 62, that is adapted for insertion into a switchgear compartment 18 through the compartment front opening 40. When the bucket assembly 50 is inserted into a corresponding compartment 18, its closed structure isolates the bucket interior from the remaining interior volume of the switchgear cabinet 16. Only insignificant quantities of decomposition products 26 (i.e., a quantity potentially sufficient to cause only minor injury to personnel) may enter the bucket 50 interior through small dimensioned apertures and sheet metal fold scoring lines 64.

Figure 3A:
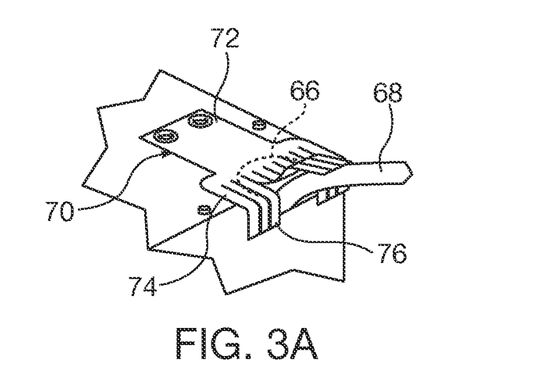
FIG. 3A is a detailed perspective view of swinging barrier of the present invention.

Referring to FIGS. 3 and 3A, an access aperture 66 is provided in the instrumentation bucket assembly top wall 58 and side wall 54, for passage of one or more wires or cables 68 (including for example instrumentation power source cables and communications cables). Swinging barrier 70, constructed of pliable flame retardant molded or sheet material, such as polypropylene sheet, has a proximal end 72 affixed to the bucket assembly top wall 58. A distal end 74 of swinging barrier 70 covers the access aperture 66, and optionally includes a plurality of pliable flaps 76 that are lifted for passage of one or more of the cables 68. An increase in pressure within the switchgear cabinet 16 exterior the instrumentation bucket assembly 50 biases the swinging barrier 70 into contact with the top wall 58 and side wall 54 around the aperture 66. Any desired number of access apertures 66 and corresponding swinging barriers 70 may be incorporated into the instrumentation bucket assembly 50. The closed box construction of the instrument bucket 50 and covering of access apertures 66 with swinging barriers 70 isolates the bucket interior from the rest of the switchgear cabinet 16 interior and potential decomposition products.

Figure 4:
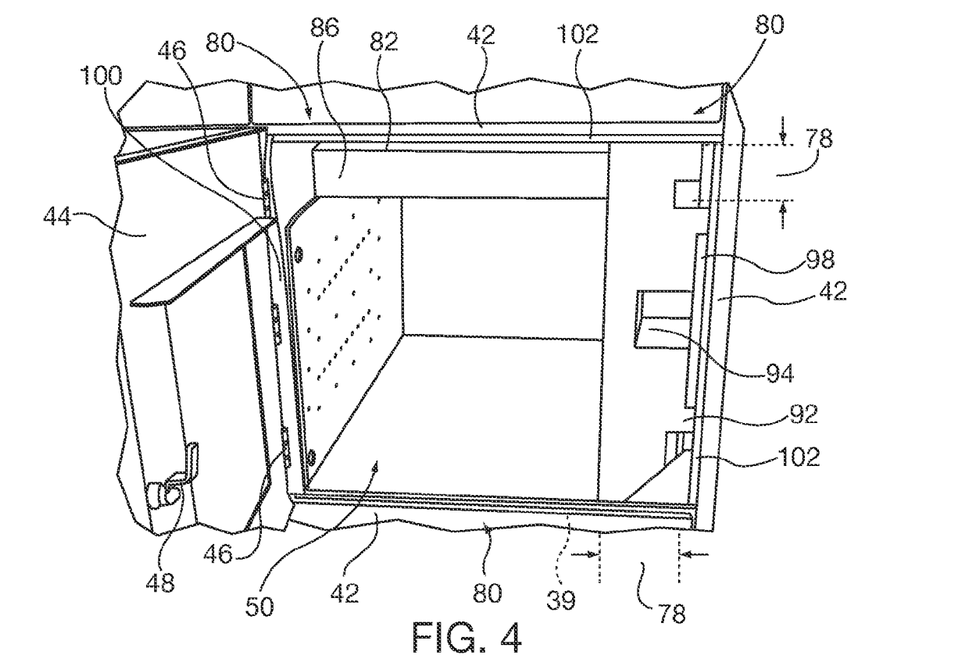
FIG. 4 is a front elevational view of the instrumentation bucket assembly of FIG. 3 installed in a switchgear compartment.

As is shown in FIG. 4, when an instrumentation bucket assembly 50 is inserted into a corresponding instrumentation compartment 18, there is a gap 78 between the compartment front opening periphery 42 and the open front bucket periphery 62. That gap 78 is sealed to inhibit passage of potential decomposition products 26 out the front face 38 of the switchgear cabinet 16. Thus once sealed, personnel may access instrumentation in the instrumentation compartment 18 while the switchgear 10 is energized.

Figure 3B:
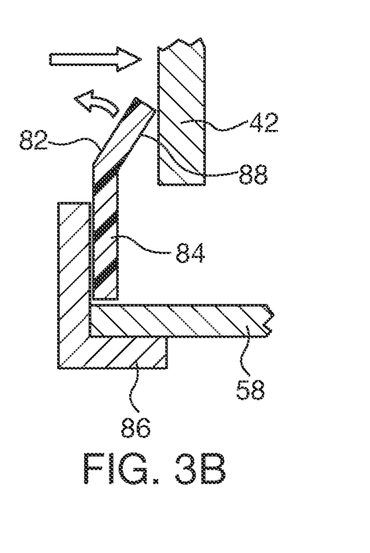
FIG. 3B is a detailed cross-sectional view of a top barrier of the present invention taken along 3B-3B of FIG. 3.

Referring to FIGS. 3, 3B and 4, the gap 78 between the instrumentation compartment 18 front opening periphery 42 and the open front bucket periphery 62 is at least partially sealed with a peripheral barrier assembly 80 that is at least partially coupled to the instrumentation bucket assembly 50 periphery. An exemplary embodiment of the peripheral barrier assembly 80 includes a bucket top barrier 82 having a proximal end 84 coupled to a bucket top flange 86. The bucket top flange 86 extends generally perpendicularly to the instrumentation bucket assembly top wall 58. The bucket top barrier 82 has a distal end 88 that projects outwardly from the bucket assembly 50 toward the corresponding compartment front opening periphery 42. As shown schematically by the double arrows in FIG. 3B, insertion of the instrumentation bucket assembly 50 into the corresponding instrument compartment biases the top barrier distal end 88 against the compartment's front opening periphery 42 as those components engage each other along their respective abutment surfaces, providing gas sealing along the abutment surfaces.

The peripheral barrier assembly 80 also seals the right side gap 78 between the bucket assembly 50 and compartment opening periphery 42 with a pair of upper and lower bucket side barriers 90 that are coupled to the instrumentation bucket assembly 50 periphery. Bucket side flange 92 is coupled to the instrumentation bucket assembly 50 right side wall 54 and projects generally perpendicularly toward the right side of the compartment opening periphery. The bucket side flange 92 defines a flange recess 94 adapted for receipt of a switchgear door lock 48 in the compartment's corresponding door 44. The respective upper and lower side barriers 90 flank the flange recess, and have construction and sealing function similar to the top barrier 82. Specifically each side barrier 90 has a proximal end 96 that is coupled to the side flange 92 and a distal end 98 adapted for biased abutting contact with the compartment's front opening periphery 42 as those components engage each other along their respective abutment surfaces, providing gas sealing along the abutment surface.

In the preferred embodiment, the gap 78 on the left side of the corresponding instrument bucket assembly 50 and the compartment front opening periphery 42 also interfaces with a swinging door 44 and its hinges 46. The left side gap 78 is sealed with a door flap barrier 100 that is preferably constructed of pliable, heat-resistant sheet material, such as polypropylene. A proximal end of the door flap barrier 100 is interposed within and affixed to one or both of the bucket 50 and compartment 18 opposing surfaces. The distal end of the door flap barrier 100 projects outwardly from the enclosure and abuts against an inner surface of the corresponding swinging door 44. The flap barrier distal end moves with the door 44 range of motion, and retards passage of any decomposition products out of the switchgear cabinet 16 front face 38.

In the preferred embodiment there is no significant gap allowing exhaust of decomposition products along the interface of the meter bucket assembly bottom wall 60 and the corresponding compartment bottom wall 39, as there is direct metal-to-metal abutting contact. If the meter bucket assembly 50 has no bottom wall 60 its corresponding side walls 34, 36 and back wall 28 are directly affixed to the compartment bottom wall 39. If desired, additional compressible, compliant gasket strips 102 may be inserted, in any peripheral gap 78 between the metering bucket assembly 50 and its corresponding enclosure compartment 18. The gasket strips 102 may provide lateral compression sealing across the gap width 78 and optionally frontal compression sealing against the enclosure's corresponding door 44 inner surface when the door is closed and locked.

Switchgear Circuit Breaker Bucket Assembly

Figure 5:
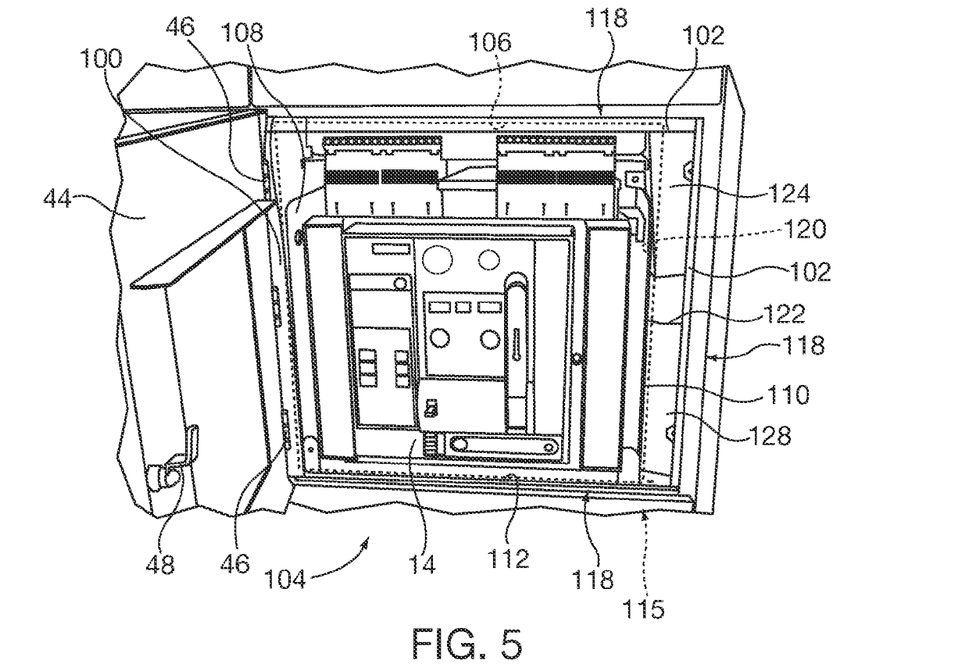
FIG. 5 is a front elevational view of a circuit breaker bucket assembly installed in a switchgear compartment.

FIGS. 2 and 5 depict an exemplary embodiment of an electrical apparatus compartment 22 with a circuit breaker apparatus bucket assembly 104 and circuit breaker 14. The apparatus bucket assembly 104 has a generally box-like construction with a top wall 106, a pair of left and right side walls 108, 110, an optional bottom wall 112, and a rear wall 114. The open front bucket periphery 115 is established by the walls 106, 108, 110 and 112. A more detailed description of exemplary apparatus bucket construction is shown in the previously identified, commonly owned U.S. patent application Ser. No. 12/362,715. Depending on the circuit breaker 14 interrupt rating, the apparatus bucket assembly side walls 108, 110 and top wall 106 may be the same as the corresponding side walls 52, 54 and top wall 58 of the previously described metering bucket assembly 50. Generally the bottom 112 and rear 114 walls, and often the top wall 106 of the an apparatus bucket assembly 104 are vented for passage of plasma, and other decomposition products 26 away from the switchgear cabinet front face and other peripheral walls and out the roof vent 27. A bottom wall 112 is schematically shown with a vent 116.

In order to permit personnel access to an energized switchgear cabinet 16 having a circuit breaker apparatus bucket assembly 104 behind a closed compartment door 44, the corresponding circuit breaker compartment 22 includes a peripheral barrier assembly 118 that optionally may be constructed similar to the barrier assembly 80 utilized in instrument bucket assemblies 50. However, given the potentially higher compartment pressures that may be generated in a circuit breaker compartment 22, it is desirable to include additional heat resistant barrier structures that provide additional frontal compression sealing in cooperation with the compartment's corresponding closed and locked door 44. Peripheral gaps 78 are sealed at the top, right side and left side of the compartment 22 and bucket assembly 104.

As shown in FIG. 5, for right side gap 78 sealing, the circuit breaker bucket assembly 104 has a side flange 120 with door lock recess 122, similar in construction and function to that of the instrument bucket assembly 50 side flange 92. A pair of upper and lower side barriers 124, 128 flank the door lock recess 122 and are affixed to the outermost face of side flange 120. The side barriers 124, 128 are constructed of a compressible heat resistant material, such as polypropylene, and are compressed by an inner face of the corresponding compartment door 44 when the door is in a closed, locked position. The right side peripheral gap 78 is also sealed by gasket strip 102, as was done in the metering bucket 50 embodiment of FIG. 4. The top gap 78 between the circuit breaker bucket assembly 104 and the corresponding compartment front opening periphery 44 is also sealed by a gasket strip 102. The left side peripheral gap is sealed, with a door flap barrier 100, as was done in the metering bucket 50 embodiment of FIG. 4. In the preferred embodiment there is no significant gap allowing exhaust of decomposition products along the interface of the meter bucket assembly bottom wall 112 and the corresponding compartment bottom wall 39, as there is direct metal-to-metal abutting contact.

As described herein, the present invention provides for a modular bucket assemblies suitable for use in instrumentation and circuit breaker apparatus compartments in switchgear, that provide for peripheral sealing about the periphery of the bucket assembly and compartment periphery. Through use of peripheral barrier modular components, a desired level and type of peripheral sealing is achieved, e.g., closed, or open door sealing, in conformity with energized switchgear personnel access standards.

Although various embodiments which incorporate the teachings of the present invention have been shown and described in detail herein, those skilled in the art can readily devise many other varied embodiments that still incorporate these teachings.

What is claimed is:

1. A modular bucket assembly, comprising:
   a box shaped bucket having a pair of bucket side walls, a bucket rear wall and a bucket top wall, all of said bucket walls defining an open front bucket periphery, the box shaped bucket sized such that a gap is formed between the open front bucket periphery and a compartment front opening periphery of a switchgear cabinet compartment when the bucket assembly is inserted therein; and
   a peripheral barrier assembly that seals the gap between the respective bucket and compartment front opening peripheries when the bucket assembly is inserted therein, wherein at least a portion thereof has a proximal portion that is coupled to the bucket about at least a portion of the open front bucket periphery and a corresponding distal portion projecting outwardly from said bucket periphery, said barrier distal portion providing a biased contact with a corresponding portion of the compartment front opening periphery when the bucket assembly is inserted therein, so that respective contacting surfaces of said barrier distal portion with the compartment front opening periphery portion inhibit arc fault decomposition product gas outflow from a front face of the switchgear cabinet compartment.

2. The bucket assembly of claim 1, further comprising:
   a swinging barrier covering an aperture formed in at least one of said bucket walls, for insertion of objects into the bucket assembly from the exterior thereof through said aperture, the swinging barrier oriented so that increase of ambient air pressure on the bucket assembly exterior biases the barrier into abutment with the barrier's corresponding bucket wall.

3. The bucket assembly of claim 2 wherein the swinging barrier is constructed of pliable material having a proximal end attached to a corresponding bucket wall and a distal end covering the corresponding bucket wall aperture, the distal end further defining pliable flaps capable of being lifted away from the bucket wall aperture for insertion of objects therethrough.

4. The bucket assembly of claim 1, further comprising:
   a bucket flange coupled to at least a portion of the open front bucket periphery, said bucket flange projecting generally perpendicularly there from and spanning the gap when the bucket assembly is inserted therein; and
   wherein at least a portion of the peripheral barrier assembly has a proximal portion that is coupled to the bucket flange and a distal portion projecting outwardly from said bucket flange, said barrier distal portion providing biased contact with a corresponding portion of the compartment front opening periphery when the bucket assembly is inserted therein.

5. The bucket assembly of claim 4, wherein:
   the bucket further comprises a bottom wall, and all of said bucket walls form a closed box defining the open front bucket periphery;

at least one of the bucket walls is coupled to the bucket flange in a continuous abutting relationship, with the peripheral barrier assembly proximal portion coupled thereto; and the bucket flange defines a bucket flange recess that couples to a switchgear door lock.

6. The bucket assembly of claim 1, wherein:

the peripheral barrier assembly includes a door flap projecting outwardly from the open front bucket periphery, said door flap having a proximal portion oriented between said bucket and open front peripheries and a distal portion that opposedly contacts an inner surface of a corresponding swinging switchgear door when the bucket assembly is inserted therein.

7. The bucket assembly of claim 1, wherein the peripheral barrier assembly further comprises at least one gasket strip that inserts within the gap when the bucket assembly is inserted therein.

8. The bucket assembly of claim 1, adapted for retention of a circuit breaker therein and insertion into a switchgear compartment, at least one of the bucket walls defining a venting aperture for passage of arc gasses out of the bucket assembly into the switchgear compartment away from the sealed bucket and switchgear frame peripheries.

9. The bucket assembly of claim 1 further comprising:

an electrical distribution system switchgear cabinet defining a compartment front opening including the compartment front opening periphery, the cabinet having:
- a swinging switchgear door for selectively covering the entire compartment front opening when closed against the periphery thereof and providing access to the compartment front opening when opened;
- first and second side walls, back wall, floor and top cover forming a closed structure about the front opening;
- a compartment formed within the switchgear cabinet front opening, for coupled receipt of the bucket assembly; and
- an arc gas venting passage in communication with an interior of the compartment for exhausting arc gasses from the compartment to an exterior of the switchgear cabinet.

10. An electrical distribution system switchgear cabinet defining a compartment front opening including a corresponding front opening periphery, the cabinet having:

first and second side walls, back wall, floor and top cover forming a closed structure about the front opening;

a first compartment formed within the switchgear front opening, coupled to a first bucket assembly of claim 1, said first bucket assembly having:
- a swinging barrier covering an aperture formed in at least one of said first bucket walls, for insertion of objects into the first bucket assembly from the exterior thereof through said aperture, the swinging barrier oriented so that an increase of ambient air pressure on the first bucket assembly exterior biases the barrier into abutment with the barrier's corresponding bucket wall;

a second compartment coupled to a second bucket assembly of claim 1 having a circuit breaker enclosed therein;

an arc gas venting passage in the switchgear cabinet in communication with the circuit breaker within the second bucket assembly and an interior of the second compartment, for exhausting arc gasses from the circuit breaker to an exterior of the switchgear cabinet; and first and second swinging switchgear doors corresponding to each first and second compartment, for selectively covering the entire respective compartment front opening when closed against the periphery thereof and providing access to the respective compartment front opening when opened.

11. The bucket assembly of claim 10, wherein:

the first bucket assembly inhibits arc gasses from escaping through the corresponding first bucket and first compartment front opening peripheries in any first compartment door position; and the second bucket assembly inhibits arc gasses from escaping through the corresponding second bucket and second compartment front opening peripheries when the second compartment door is secured in a closed position over the second compartment front opening.

12. A modular bucket assembly, comprising:

a box shaped bucket having a pair of bucket side walls, a bucket rear wall, a bucket top wall and a bucket bottom wall, all of said bucket walls defining an open front bucket periphery, the box shaped bucket sized such that a gap is formed between the open front bucket periphery and a compartment front opening periphery of a switchgear cabinet compartment when the bucket assembly is inserted therein;

a swinging barrier covering an aperture formed in at least one of said bucket walls, for insertion of objects into the bucket assembly from the exterior thereof through said aperture, the swinging barrier oriented so that increase of ambient air pressure on the bucket assembly exterior biases the barrier into abutment with the barrier's corresponding bucket wall;

a bucket flange coupled to at least a portion of the open front bucket periphery, said bucket flange projecting generally perpendicularly there from and spanning a portion of the gap between the respective bucket and compartment front opening peripheries when the bucket assembly is inserted therein; and a peripheral barrier assembly that seals the gap between the respective bucket and compartment front opening peripheries when the bucket assembly is inserted therein, wherein at least a portion thereof has a proximal portion that is coupled to the bucket flange and a corresponding distal portion projecting outwardly from said bucket periphery, said barrier distal portion providing a biased contact with a corresponding portion of the compartment front opening periphery when the bucket assembly is inserted therein, so that respective contacting surfaces of said barrier distal portion with the compartment front opening periphery portion inhibit arc fault decomposition product gas outflow from a front face of the switchgear compartment.

13. The bucket assembly of claim 12, wherein the swinging barrier is constructed of pliable material having a proximal end attached to a corresponding bucket wall and a distal end covering the corresponding bucket wall aperture, the distal end further defining pliable flaps capable of being lifted away from the bucket wall aperture for insertion of objects therethrough.

14. The bucket assembly of claim 12, wherein:

the bucket bottom wall butts against a compartment bottom wall of a switchgear compartment when the bucket is inserted therein;

at least one of the bucket side walls and the top wall is coupled to the bucket flange in a continuous abutting relationship; and the peripheral barrier assembly proximal portion is coupled to the bucket flange.

15. The bucket assembly of claim 12, wherein:
the peripheral barrier assembly includes a door flap projecting outwardly from the open front bucket periphery, said door flap having a proximal portion oriented between said bucket and open front peripheries and a distal portion that opposedly contacts an inner surface of a corresponding swinging switchgear door when the bucket assembly is inserted therein.

16. The bucket assembly of claim 15, wherein the bucket flange defines a bucket flange recess that couples to a switchgear door lock.

17. The bucket assembly of claim 15, wherein the peripheral barrier assembly further comprises at least one gasket strip that inserts within the gap when the bucket assembly is inserted therein.

18. The bucket assembly of claim 12, wherein the peripheral barrier assembly inhibits arc gasses from escaping through the sealed bucket and switchgear frame peripheries when said bucket assembly is installed in a corresponding switchgear cabinet compartment.

19. The bucket assembly of claim 12, wherein the peripheral barrier assembly inhibits arc gasses from escaping through the sealed bucket and switchgear frame peripheries when said bucket assembly is installed in a corresponding switchgear cabinet compartment and a corresponding switchgear compartment door is secured in a closed position over the compartment front opening.

20. The bucket assembly of claim 12 further comprising:
an electrical distribution system switchgear cabinet defining a compartment front opening including the compartment front opening periphery, the cabinet having:
a swinging switchgear door for selectively covering the entire compartment front opening when closed against the periphery thereof and providing access to the compartment front opening when opened;
first and second side walls, back wall, floor and top cover forming a closed structure about the front opening;
the switchgear cabinet compartment formed within the switchgear cabinet front opening, coupled to the bucket assembly; and
an arc gas venting passage in communication with an interior of the compartment for exhausting arc gasses from the compartment to an exterior of the switchgear cabinet.

* * * * *